(12) United States Patent
Iwami et al.

(10) Patent No.: US 10,985,494 B2
(45) Date of Patent: Apr. 20, 2021

(54) VEHICLE CONNECTOR

(71) Applicant: Yazaki Corporation, Tokyo (JP)

(72) Inventors: Tomokazu Iwami, Shizuoka (JP);
Hiroka Nahara, Shizuoka (JP);
Michitake Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/674,073

(22) Filed: Nov. 5, 2019

(65) Prior Publication Data
US 2020/0153157 A1    May 14, 2020

(30) Foreign Application Priority Data

Nov. 9, 2018 (JP) .............................. JP2018-211348

(51) Int. Cl.
*H01R 13/52* (2006.01)

(52) U.S. Cl.
CPC ..... *H01R 13/5227* (2013.01); *H01R 13/5202* (2013.01)

(58) Field of Classification Search
CPC ............ H01R 13/5227; H01R 13/5221; H01R 13/5208; H01R 13/5205; H01R 13/5213; H01R 13/521; H01R 13/5202
USPC ................. 439/205, 206, 275, 274, 587–589
See application file for complete search history.

(56) References Cited

U.S. PATENT DOCUMENTS

| | | | | |
|---|---|---|---|---|
| 7,371,092 B2* | 5/2008 | Okumura | ........... | H01R 13/5205 439/205 |
| 8,257,101 B2* | 9/2012 | Ichio | ................. | H01R 13/4367 439/206 |
| 8,303,331 B2* | 11/2012 | Yu | ...................... | H01R 12/7088 439/206 |
| 8,597,039 B2* | 12/2013 | Osawa | ............... | H01R 13/5227 439/205 |
| 8,662,910 B2* | 3/2014 | Ichio | ................. | H01R 13/5208 439/206 |
| 8,827,731 B2* | 9/2014 | Sasaki | ................ | H01R 13/5227 439/206 |
| 9,478,899 B2* | 10/2016 | Kurita | ................ | H01R 13/5227 |

(Continued)

FOREIGN PATENT DOCUMENTS

| | | |
|---|---|---|
| JP | 2011-175764 A | 9/2011 |
| JP | 2013-62055 A | 4/2013 |

(Continued)

*Primary Examiner* — Gary F Paumen
(74) *Attorney, Agent, or Firm* — Sughrue Mion, PLLC

(57) ABSTRACT

A connector includes: a connector housing including a connector fitting chamber to which a mating connector is fitted, in which a terminal is arranged in a projecting state in the connector fitting chamber; a rear case that is assembled to the connector housing through intermediation of a packing; a water drainage passage provided in the connector housing, which allows water that has entered a front side of the connector housing to flow into an inside of the rear case; a drainage port provided in the rear case; a terminal accommodating portion that holds the terminal in the projecting state in the connector fitting chamber and has an opening portion on a back side of the rear case; and an O-ring interposed between an inner peripheral surface of the terminal accommodating portion on a side of the rear case and an outer peripheral surface of the terminal.

5 Claims, 4 Drawing Sheets

(56) References Cited

U.S. PATENT DOCUMENTS

| | | | |
|---|---|---|---|
| 2005/0178576 A1* | 8/2005 | Saka | H01R 13/5227 |
| | | | 174/66 |
| 2012/0295460 A1* | 11/2012 | Ichio | H01R 13/74 |
| | | | 439/205 |
| 2013/0078846 A1 | 3/2013 | Sasaki et al. | |
| 2015/0325948 A1* | 11/2015 | Kurita | B60L 53/16 |
| | | | 439/206 |

FOREIGN PATENT DOCUMENTS

| | | |
|---|---|---|
| JP | 2017208228 A | 11/2017 |
| JP | 2017208265 A | 11/2017 |
| JP | 2017208266 A | 11/2017 |
| JP | 2017212159 A | 11/2017 |
| JP | 2018133278 A | 8/2018 |

\* cited by examiner

VEHICLE CONNECTOR

BACKGROUND

Technical Field

The present disclosure relates to a connector used in a vehicle.

Related Art

A connector is provided to a vehicle such as an electric car or a hybrid car to charge a battery to be mounted (JP 2011-175764 A).

The charging connector includes a vehicle-body mounting portion, a connector housing fixed to the vehicle-body mounting portion, and a grommet arranged on the back side of the connector housing. The connector housing includes a housing base portion fixed to the vehicle-body mounting portion, a bottom wall portion fixed to the housing base portion, a hood portion protruding from the bottom wall portion, and an inner housing portion fixed to the housing base portion.

A connector fitting chamber (inlet opening portion) surrounded by the hood portion and the bottom wall portion is opened on the front side of the connector housing. The inner housing portion is arranged such that the distal end side thereof projects into the connector fitting chamber. The inner housing portion is provided with a plurality of terminal accommodating portions. A terminal is accommodated in each of the terminal accommodating portions. Each terminal is arranged in a state in which the distal end projects from the connector fitting chamber (inlet opening portion).

In the bottom wall portion of the connector housing, the inner housing portion, and the like, water drainage passages communicating between the side of the connector fitting chamber and the back side thereof are provided at a plurality of places.

The grommet is formed of a rubber material or the like likely to be elastically deformed. The grommet is assembled so as to cover the entire back side of the connector housing. A drainage passage is formed at the lowermost position of the grommet. Cable insertion holes are provided in the back surface portion of the grommet. Cables connected to the terminals are drawn out from the cable insertion holes.

In the above configuration, water that has entered the connector fitting chamber (inlet opening portion) is collected to the lower portion inside the grommet through each water drainage passage and drained to the outside through the drainage passage. Therefore, the back side of the connector can be prevented from getting wet with water.

SUMMARY

However, in the conventional connector, the terminals with a cable are passed through the cable insertion holes of the grommet, and the terminals passed through the grommet are accommodated in the terminal accommodating portions of the connector housing by insertion. Thereafter, the grommet is assembled to the connector housing. That is, before the grommet is assembled to the connector housing, it is necessary to cause the terminals with the cable to pass through the grommet in advance. For this reason, there is a problem that assembly workability is bad.

Then, an object of this disclosure is to provide a connector which can prevent the back side of a connector from getting wet with water without deteriorating assembly workability.

According to an embodiment of the present disclosure, there is provided a connector including: a connector housing including a connector fitting chamber to which a mating connector is fitted, in which a terminal is arranged in a projecting state in the connector fitting chamber; a rear case that covers a back side of the connector housing opposite to a side on which the mating connector is fitted, and is assembled to the connector housing through intermediation of a first waterproof member; a plurality of water drainage passages provided in the connector housing, which allows water that has entered the side of the connector housing on which the mating connector is fitted to flow into an inside of the rear case; a drainage port provided in the rear case, which drains water inside the rear case to an outside; a terminal accommodating portion that holds the terminal in the projecting state in the connector fitting chamber and has an opening portion on a back side of the rear case; and a second waterproof member interposed between an inner peripheral surface of the terminal accommodating portion on a side of the rear case and an outer peripheral surface of the terminal.

According to the above configuration, the water that has entered the inside of the side of the connector housing on which the mating connector is fitted is collected to the inside of the rear case through the plurality of water drainage passages and is drained to the outside through the drainage port of the rear case. In addition, since the gap between the connector housing and the rear case is water-stopped by the first waterproof member, and the gap between the inside of the terminal holding portion of the rear case and the terminal is water-stopped by the second waterproof member. Thus, the water does not leak from those gaps to the outside of the rear case. With this, the outside of the back side of the connector can be prevented from getting wet with water. Since the terminal can be accommodated in the terminal accommodating portion from the opening portion of the terminal accommodating portion of the rear case assembled to the connector housing, the terminal can be attached to the rear case without causing the terminal to pass through the rear case in advance. With this, the back side of the connector can be prevented from getting wet with water without deteriorating assembly workability.

DETAILED DESCRIPTION

Figure 1:
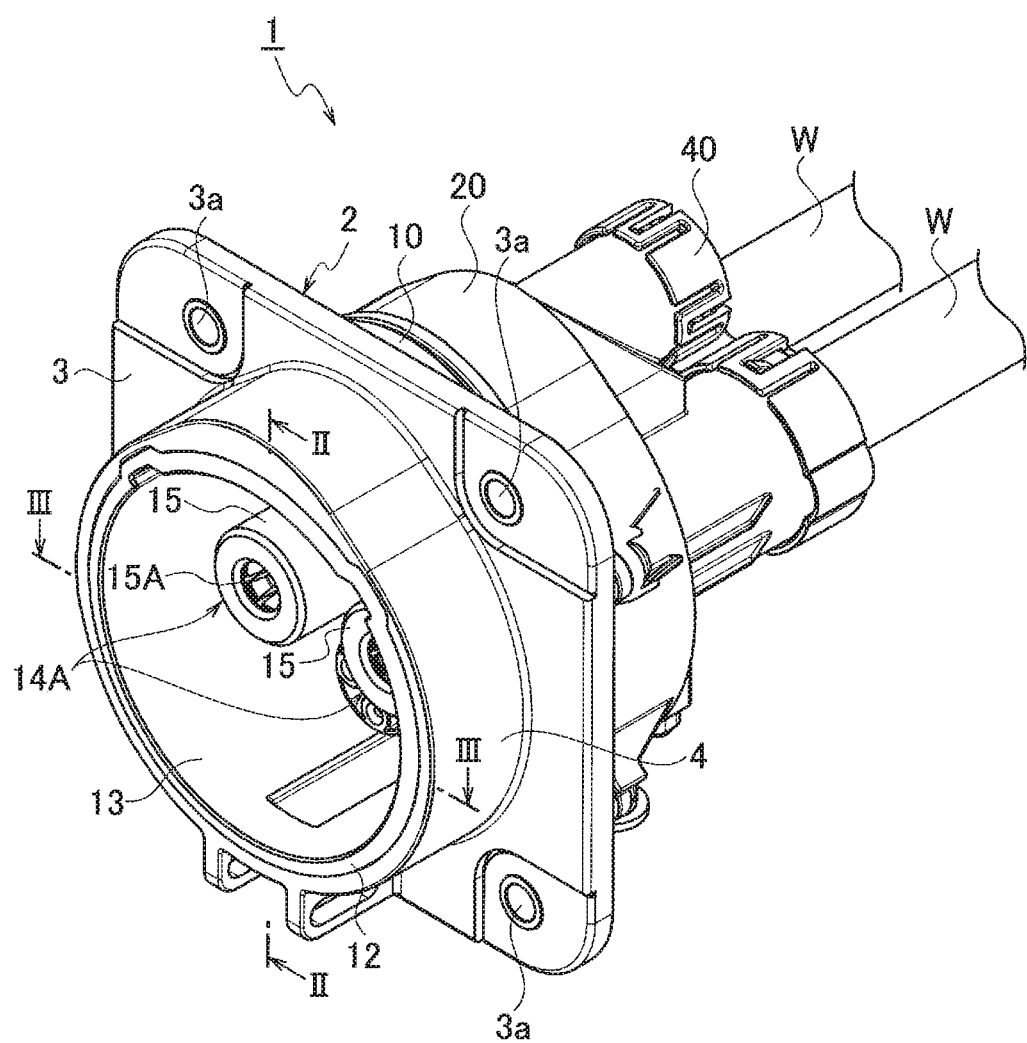
FIG. 1 illustrates an embodiment of the present disclosure and is a perspective view of a connector.

Hereinafter, an embodiment of the present disclosure will be described with reference to the drawings.

FIGS. 1 to 5 illustrate an embodiment of the present disclosure. A connector 1 includes a vehicle-body mounting housing 2, a connector housing 10 fixed to the vehicle-body mounting housing 2, and a rear case 20 assembled to the back side of the connector housing 10.

The vehicle-body mounting housing 2 includes a flange portion 3 and a cylindrical body 4 projecting forward from the center of the flange portion 3. The vehicle-body mounting housing 2 is fixed with bolts to a vehicle body (not illustrated) using holes 3a of the flange portion 3.

The connector housing 10 includes a bottom wall portion 11 and a hood portion 12 erected from the bottom wall portion 11. The hood portion 12 is arranged in the cylindrical body 4 of the vehicle-body mounting housing 2 without a gap and is fixed to the cylindrical body 4. A connector fitting chamber 13 is formed surrounded by the hood portion 12 and the bottom wall portion 11. The connector fitting chamber 13 is open on the front side of the connector housing 10. For example, a mating connector (not illustrated) on the charging stand side is fitted to the connector fitting chamber 13.

Figure 2:
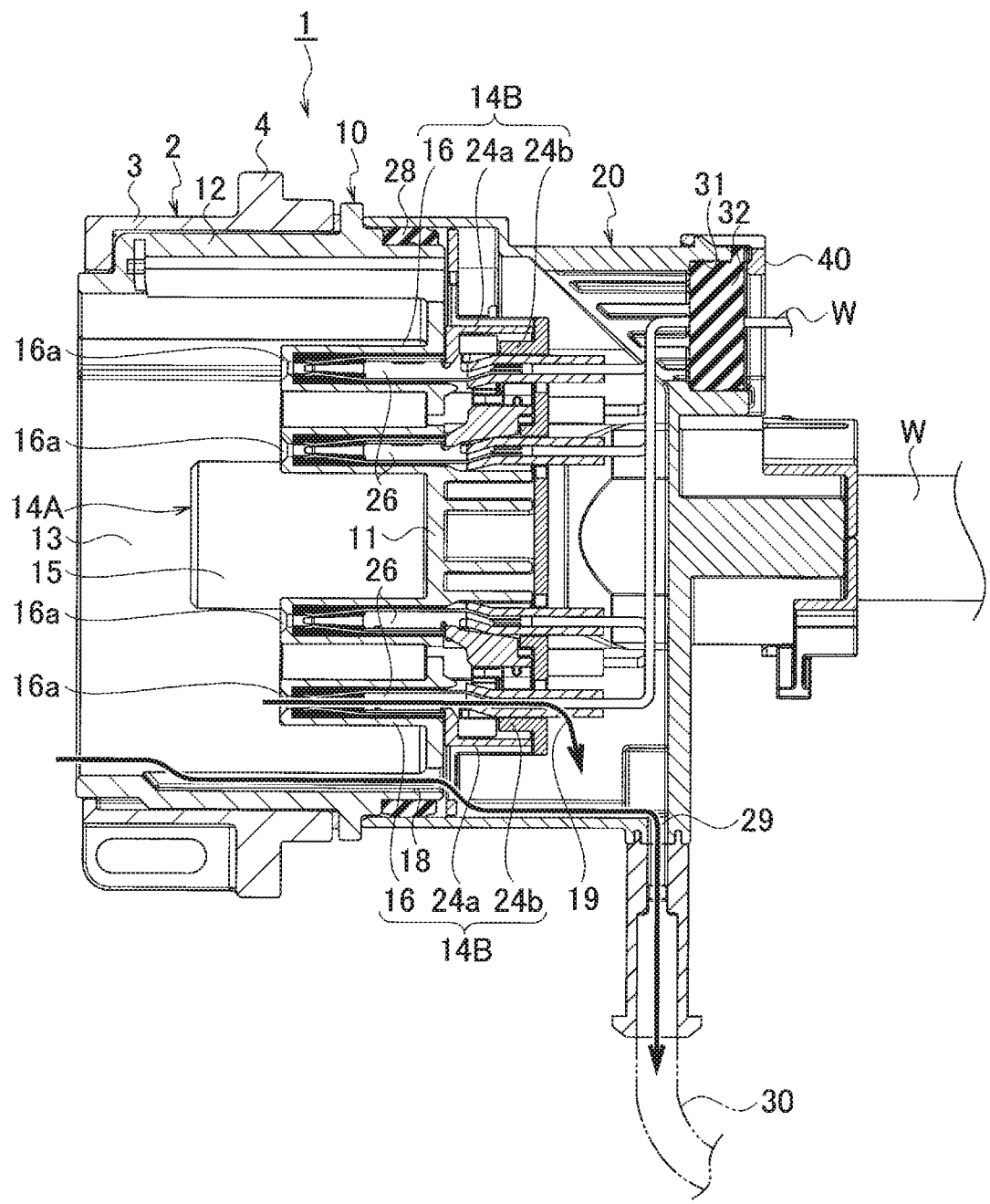
FIG. 2 illustrates the embodiment of the present disclosure, and is a cross-sectional view taken along the line II-II of FIG. 1.
Figure 3:
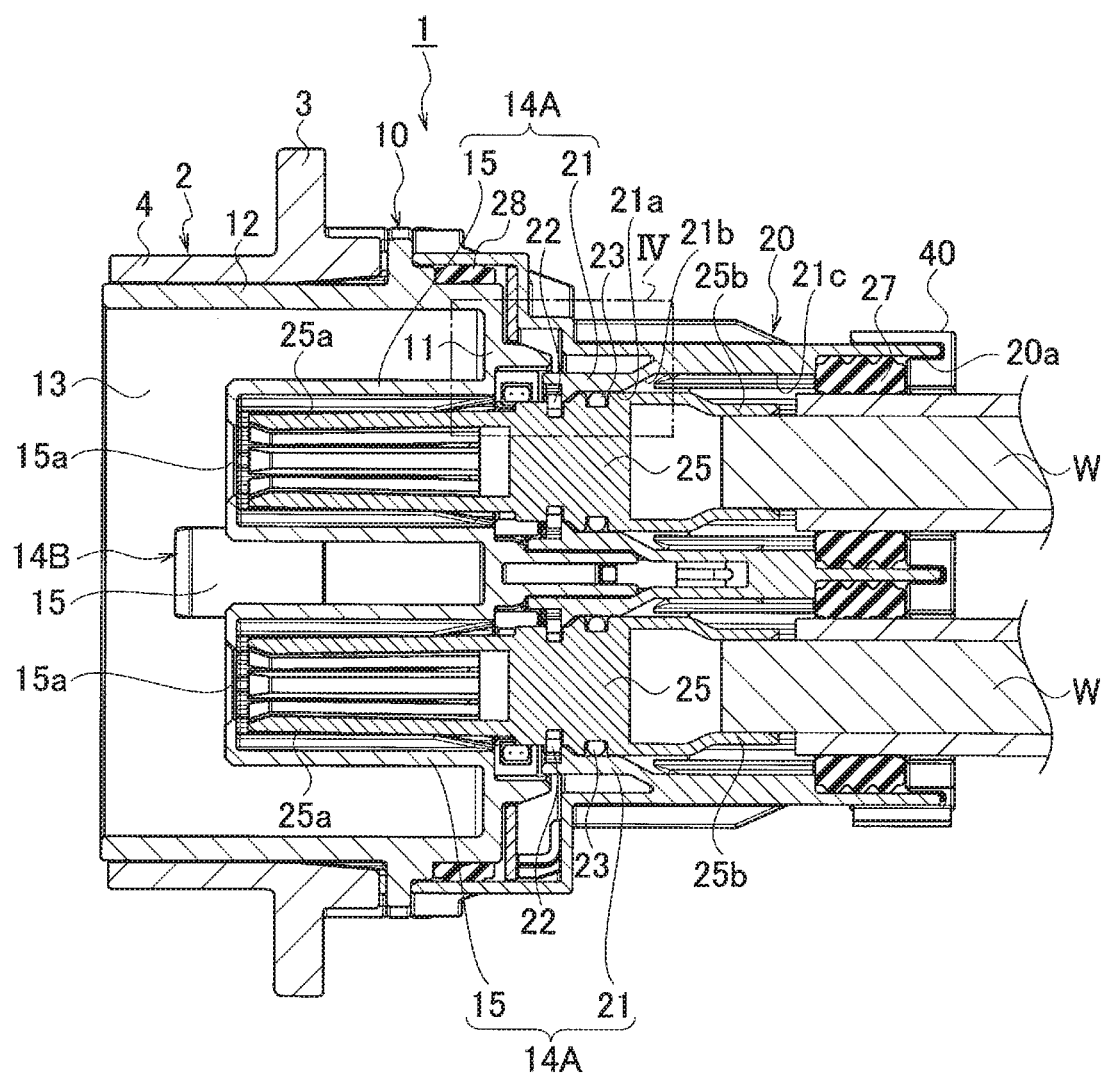
FIG. 3 illustrates the embodiment of the present disclosure, and is a cross-sectional view taken along the line III-III of FIG. 1.
Figure 4:
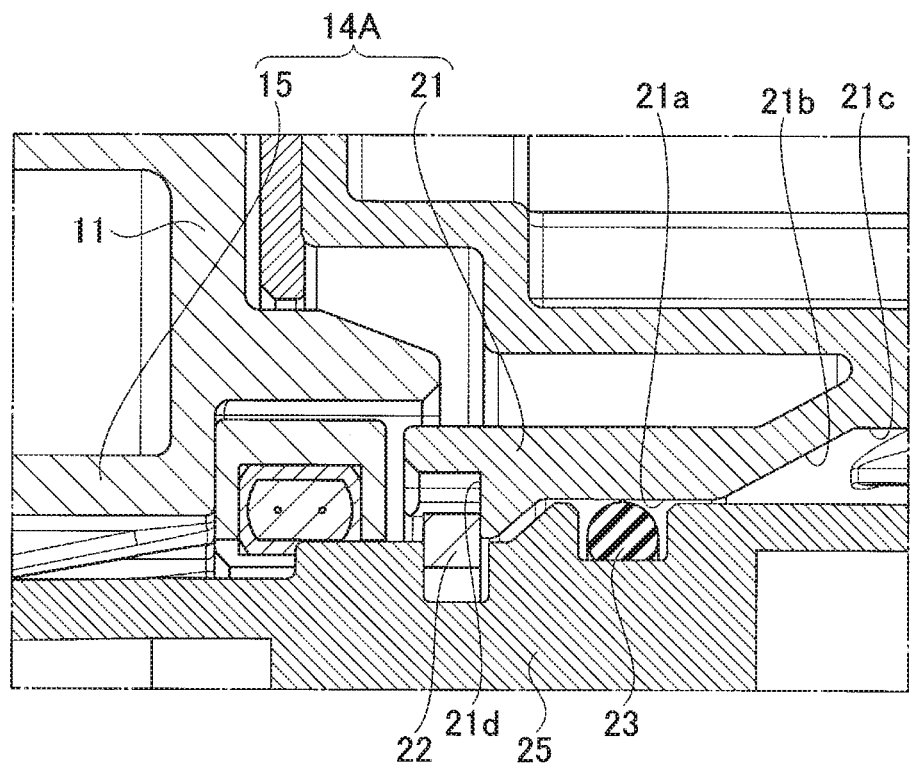
FIG. 4 illustrates the embodiment of the present disclosure, and is an enlarged view of a portion IV of FIG. 3.

The bottom wall portion 11 is provided with, for example, ten terminal protection walls 15 and 16 projecting into the connector fitting chamber 13. Terminal insertion holes 15a and 16a, into which mating terminals (not illustrated) are inserted, are formed at the distal end portions of the terminal protection walls 15 and 16, respectively. Two terminal protection walls 15 protect portions of power terminals 25 projecting to the connector fitting chamber 13 described below. Eight terminal protection walls 16 (four of which are illustrated in FIG. 2) protect portions of signal terminals 26 projecting into the connector fitting chamber 13 described below.

The bottom wall portion 11 is provided with a water drainage passage 18 at the lowermost position of the connector fitting chamber 13 in the vehicle installation state. The water drainage passage 18 communicates the front side and the back side of the bottom wall portion 11.

The rear case 20 is formed of a resin material. The rear case 20 is assembled so as to cover the entire back side of the connector housing 10. Between the rear case 20 and the outer peripheral surface of the connector housing 10, a packing 28, which is a first waterproof member, is interposed over the entire circumference. A space between the rear case 20 and the connector housing 10 is water-stopped by the packing 28.

At the lowermost position of the rear case 20, a drainage port 29 is formed. The drainage port 29 is open on the outer periphery of the rear case 20. A drain hose 30 is connected to the drainage port 29. The distal end of the drain hose 30 is, for example, led outside the vehicle.

In the rear case 20, a cable opening 31 is provided at the uppermost position in the vehicle installation state. Cables W connected to the respective signal terminals 26 are respectively drawn out from the cable opening 31. A mat seal 32 is attached to the cable opening 31 in a compressed state. The cable opening 31 is waterproofed by the mat seal 32.

The rear case 20 is provided with two terminal holding walls 21. The respective terminal holding walls 21 are arranged coaxially with the respective terminal protection walls 15 of the connector housing 10, and are in communication with the respective terminal insertion holes 15a.

A pair of the terminal protection wall 15 and the terminal holding wall 21 coaxially arranged constitutes a terminal accommodating portion 14A. The two large-diameter terminal accommodating portions 14A are for the power terminals 25. The power terminals 25 each include a female contact portion 25a circumferentially arranged and a cable connection portion 25b crimped to the cable W. The signal terminals 26 each include a female contact portion arranged apart from each other and a cable connection portion connected to the cable W.

Next, the configurations of the terminal holding walls 21 will be described in detail. Each terminal holding wall 21 of the large-diameter terminal accommodating portion 14A has an opening portion 20a on the back side of the rear case 20. Each terminal holding wall 21 extends from the front side to the back side of the rear case 20, and includes an accommodating chamber 21a having diameters in which the power terminal 25 is accommodated without a gap, a taper chamber 21b gradually expanding from the accommodating chamber 21a, and a large-diameter chamber 21c having diameters in which the power terminal 25 is inserted with a gap. The back surface end of the large-diameter chamber 21c is the opening portion 20a.

The power terminal 25 is held (fixed) by a C-ring 22 on the terminal holding wall 21. An O-ring 23 which is a second waterproof member is attached to the outer periphery of the power terminal 25. The outer periphery of the power terminal 25 and the inner peripheral surface of the terminal holding wall 21 are waterproofed by the O-ring 23. The cable W connected to the power terminal 25 is waterproofed by a seal rubber 27 which is a third waterproof member interposed between the cable W and the inner peripheral surface of the terminal holding wall 21. The seal rubber 27 is held by a seal rubber holding member 40 attached to the outside of the back surface of the rear case 20.

On the other hand, the back side of each of the small-diameter terminal protection walls 16 of the connector housing 10 is open in the rear case 20. A terminal locking member 24a and a cover 24b are mounted on the back side of each of the small-diameter terminal protection walls 16 opened in the rear case 20. A small-diameter terminal accommodating portion 14B is configured by each of the terminal protection walls 16, the terminal locking member 24a, and the cover 24b. The eight small-diameter terminal accommodating portions 14B are for the signal terminals 26.

Each signal terminal 26 is held (fixed) by the terminal locking member 24a. A waterproof member is not interposed between the terminal protection wall 16, the terminal locking member 24a, and the cover 24b, and the signal terminal 26. A gap is formed between these members 16, 24a, 24b, 26 instead of a waterproof member. This gap constitutes a water drainage passage 19.

In the above configuration, water that has entered the inside of the connector fitting chamber 13 or the like of the connector housing 10 falls into the inside of the rear case 20 through the plurality of water drainage passages 18 and 19, and the collected water is drained to the outside from the drainage port 29 of the rear case 20 through the drain hose 30. Therefore, the outside of the back side of the connector 1 can be prevented from getting wet with water.

Next, assembly of the power terminal 25 to the connector 1 will be described. The rear case 20 is assembled to the connector housing 10. After the rear case 20 is assembled, the power terminals 25 are assembled.

Figure 5:
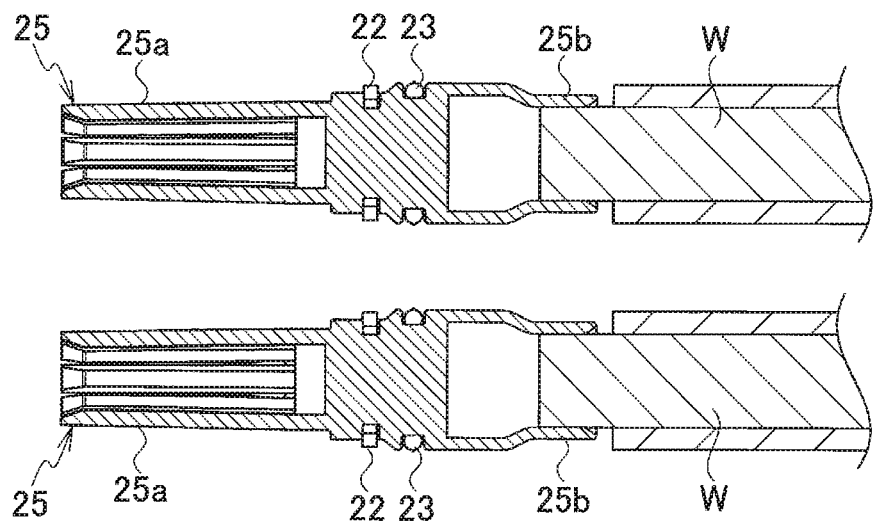
FIG. 5 illustrates the embodiment of the present disclosure, specifically, illustrates terminals to which cables are connected.

As illustrated in FIG. 5, the power terminals 25 are each connected to the cable W, and the C-ring 22 and the O-ring 23 are attached. The power terminals 25 are inserted from the opening portions 20a of the terminal holding walls 21 of the rear case 20. Then, the C-ring 22 attached to the power terminal 25 is contracted when passing through the taper chamber 21b, and insertion is permitted. When the power terminal 25 is inserted to the insertion completion position of the terminal accommodating portion 14A, the C-ring 22 expands and enters a recess 21d (illustrated in FIG. 4) of the terminal holding wall 21. Thus, the power terminal 25 is positioned and fixed to the terminal accommodating portion 14A.

The O-ring 23 attached to the outer periphery of the power terminal 25 is in close contact with the inner peripheral surface of the terminal holding wall 21 in a compressed state. Thus, the terminal accommodating portion 14A in which the power terminal 25 is accommodated is water-stopped. The water that has entered the terminal accommodating portion 14A from the side of the connector fitting chamber 13 is water-stopped at the position of the O-ring 23.

Further, the seal rubber 27 is in close contact with the outer periphery of the cable W and the inner peripheral surface of the terminal holding wall 21 in a compressed state. Thus, the terminal accommodating portion 14A in which the cable W is accommodated is water-stopped. The seal rubber 27 also prevents water entering the rear case 20 along the outer periphery of the cable W from the back side of the rear case 20.

As described above, the connector 1 includes: the connector housing 10 including the connector fitting chamber 13 to which the mating connector is fitted, in which the power terminals 25 are arranged in a projecting state in the connector fitting chamber 13; the rear case 20 that covers the back side of the connector housing 10 opposite to the side on which the mating connector is fitted, and is assembled to the connector housing 10 through intermediation of the packing 28; the plurality of water drainage passages 18 and 19 provided in the connector housing 10, which allows water that has entered the side of the connector housing 10 on which the mating connector is fitted to flow into an inside of the rear case 20; the drainage port 29 provided in the rear case 20, which drains water inside the rear case 20 to the outside; the terminal accommodating portions 14A that hold the power terminals 25 in the projecting state in the connector fitting chamber 13 and has the opening portion 20a on the back side of the rear case 20; and the O-rings 23 each interposed between the inner peripheral surface of the terminal accommodating portion 14A on a side of the rear case 20 and the outer peripheral surface of the power terminal 25.

Therefore, the water which has entered the inside of the side of the connector housing 10 on which the mating connector is fitted enters the inside of the rear case 20 through the plurality of water drainage passages 18 and 19, and the water that has entered the inside of the rear case 20 is drained to the outside from the drainage port 29 of the rear case 20. At the same time, the gap between the connector housing 10 and the rear case 20 is water-stopped by the packing 28, and the gap between the inside of the terminal holding wall 21 of the rear case 20 and the power terminal 25 is water-stopped by the O-ring 23. Thus, the water does not leak from those gaps to the outside of the rear case 20. As described above, the outside of the back side of the connector 1 can be prevented from getting wet with water. Since the power terminal 25 can be accommodated in the terminal accommodating portion 14A from the opening portion 20a of the terminal accommodating portion 14A of the rear case 20 assembled to the connector housing 10, the power terminal 25 can be attached to the rear case 20 without causing the power terminal 25 to pass through the rear case 20 in advance. As described above, the back side of the connector 1 can be prevented from getting wet with water without deteriorating assembly workability.

The drain hose 30 is connected to the drainage port 29. Therefore, water can be drained to a predetermined place by the drain hose 30.

The terminal accommodating portion 14A includes the terminal protection wall 15 provided in the connector housing 10 and projecting to the connector fitting chamber 13, and the terminal holding wall 21 provided in the rear case 20 and holding the power terminal 25. The seal rubber 27 is interposed between the inner peripheral surface of the terminal holding wall 21 and the outer peripheral surface of the cable W connected to the power terminal 25.

Therefore, the O-ring 23 and the seal rubber 27 form a double water-stop structure, and water can be reliably prevented from leaking from the inside of the rear case 20 through the terminal holding wall 21 to the back side of the connector 1. In particular, the gap due to the bending of the cable W can be effectively prevented.

In this embodiment, the opening portion 20a is provided on the back side of the rear case 20 in the terminal accommodating portion 14A of the power terminal 25. However, the opening portion 20a may be provided on the back side of the rear case 20 also in the terminal accommodating portion 14B of the signal terminal 26.

In this embodiment, the terminal holding wall 21 of the terminal accommodating portion 14A of the power terminal 25 is provided in the rear case 20, but the terminal holding wall 21 may be provided across the connector housing 10 and the rear case 20.

What is claimed is:

1. A connector comprising:
a connector housing including a connector fitting chamber to which a mating connector is fitted, in which a terminal is arranged in a projecting state in the connector fitting chamber;
a rear case that covers a back side of the connector housing opposite to a side on which the mating connector is fitted, and is assembled to the connector housing through intermediation of a first waterproof member;
a water drainage passage provided in the connector housing, which allows water that has entered the side of the connector housing on which the mating connector is fitted to flow into an inside of the rear case;
a drainage port provided in the rear case, which drains water inside the rear case to an outside;
a terminal accommodating portion that holds the terminal in the projecting state in the connector fitting chamber and has an opening portion on a back side of the rear case; and
a second waterproof member interposed between an inner peripheral surface of the terminal accommodating portion on a side of the rear case and an outer peripheral surface of the terminal,
wherein the terminal is configured to be inserted at the opening portion of the rear case into the terminal accommodating portion, and the terminal has an elastic member that engages with a terminal holding wall of the rear case.

2. The connector according to claim 1,
wherein a drain hose is connected to the drainage port.

3. The connector according to claim 1,
wherein the terminal accommodating portion includes a terminal protection wall provided in the connector housing and protruding to the connector fitting chamber, and a terminal holding wall provided in the rear case and holding the terminal, and
a third waterproof member is interposed between an inner peripheral surface of the terminal holding wall and an outer peripheral surface of a cable connected to the terminal.

4. The connector according to claim 2,
wherein the terminal accommodating portion includes a terminal protection wall provided in the connector housing and protruding to the connector fitting chamber, and a terminal holding wall provided in the rear case and holding the terminal, and a third waterproof member is interposed between an inner peripheral surface of the terminal holding wall and an outer peripheral surface of a cable connected to the terminal.

5. The connector according to claim 1, wherein the elastic member comprises a C-ring.

\* \* \* \* \*